United States Patent
Suzuki et al.

(10) Patent No.: US 10,366,259 B2
(45) Date of Patent: Jul. 30, 2019

(54) READING DEVICE

(71) Applicants: TOSHIBA TEC KABUSHIKI KAISHA, Tokyo (JP); FAST RETAILING CO., LTD., Yamaguchi (JP)

(72) Inventors: Shigeaki Suzuki, Shizuoka (JP); Dai Namiki, Tokyo (JP); Takahiro Tambara, Tokyo (JP)

(73) Assignees: TOSHIBA TEC KABUSHIKI KAISHA, Tokyo (JP); FAST RETAILING CO., LTD., Yamaguchi (JP)

(*) Notice: Subject to any disclaimer, the term of this patent is extended or adjusted under 35 U.S.C. 154(b) by 0 days.

(21) Appl. No.: 15/622,899

(22) Filed: Jun. 14, 2017

(65) Prior Publication Data

US 2017/0372101 A1    Dec. 28, 2017

(30) Foreign Application Priority Data

Jun. 23, 2016 (JP) ................. 2016-124700

(51) Int. Cl.
*G06K 7/08* (2006.01)
*G06K 7/10* (2006.01)
(Continued)

(52) U.S. Cl.
CPC .......... *G06K 7/10316* (2013.01); *A47F 9/048* (2013.01); *G06Q 20/206* (2013.01);
(Continued)

(58) Field of Classification Search
CPC ...... G06Q 10/08; G06Q 10/087; G06Q 30/00; G06Q 20/206; H04W 4/008;
(Continued)

(56) References Cited

U.S. PATENT DOCUMENTS 6,829,520 B1 * 12/2004 Green ................. G01K 3/04
                                                    235/385
7,518,511 B1 *  4/2009 Panja ................. G06Q 10/08
                                                    340/539.13
(Continued)

FOREIGN PATENT DOCUMENTS

CN       102314587 A    1/2012
CN       105005748 A   10/2015
(Continued)

OTHER PUBLICATIONS

Extended European Search Report dated Oct. 17, 2017, filed in counterpart European Patent Application No. 17176921.9 (8 pages).
(Continued)

*Primary Examiner* — Claude J Brown
(74) *Attorney, Agent, or Firm* — Kim & Stewart LLP

(57) ABSTRACT

According to one embodiment, a reading device is configured to read information from an RFID tag attached to a product. The reading device includes a housing, an antenna, an opening-and-closing lid, a detector, a reading unit, and an alert unit. The housing includes an opening portion, and therein a space for accommodating the product. The antenna is provided within the space. The opening-and-closing lid is opening and closing the opening portion. The detector is configured to detect an open or closed state of the opening-and-closing lid. The reading unit is configured to read the information from the RFID tag. The alert unit is configured to issue an alert on an operation method in accordance with the open or closed state of the opening-and-closing lid and an operation state of the reading unit.

5 Claims, 7 Drawing Sheets

(51) Int. Cl.
  *A47F 9/04* (2006.01)
  *G06Q 20/20* (2012.01)
  *G07G 1/00* (2006.01)
  *G07G 3/00* (2006.01)
  *A47F 10/00* (2006.01)

(52) U.S. Cl.
  CPC ........... *G07G 1/009* (2013.01); *G07G 1/0045* (2013.01); *G07G 3/00* (2013.01); *A47F 2010/005* (2013.01)

(58) Field of Classification Search
  CPC ....... G06K 7/10366; G06K 2017/0067; G06K 7/10316; B65D 90/48; A47F 9/048; A47F 2010/005; G07G 1/009; G07G 1/0045; G07G 3/00
  USPC .......................................................... 235/451
  See application file for complete search history.

(56) References Cited

U.S. PATENT DOCUMENTS

| | | | | |
|---|---|---|---|---|
| 7,994,897 | B2* | 8/2011 | Azevedo | G06Q 10/087 235/375 |
| 8,095,435 | B2* | 1/2012 | Newton | G06K 17/00 705/22 |
| 8,384,545 | B2* | 2/2013 | Hussain | G06K 7/10178 312/209 |
| 8,659,395 | B2* | 2/2014 | Kilian | G06K 7/10178 340/10.1 |
| 2006/0022827 | A1* | 2/2006 | Higham | G06K 17/00 340/572.1 |
| 2006/0109106 | A1* | 5/2006 | Braun | G06Q 10/08 340/539.13 |
| 2006/0208072 | A1* | 9/2006 | Ku | G06K 7/0008 235/383 |
| 2006/0267730 | A1* | 11/2006 | Steinke | G06K 7/0004 340/10.1 |
| 2007/0001809 | A1* | 1/2007 | Kodukula | G06K 7/0008 340/10.1 |
| 2007/0108273 | A1* | 5/2007 | Harper | G06Q 10/087 235/382 |
| 2007/0150381 | A1* | 6/2007 | Pippia | F25D 29/00 705/28 |
| 2008/0015956 | A1* | 1/2008 | Regard | A47F 9/042 705/28 |
| 2008/0088454 | A1* | 4/2008 | Flores | G08B 13/2457 340/572.4 |
| 2008/0103939 | A1* | 5/2008 | Gibb | G06Q 10/087 705/28 |
| 2008/0116269 | A1* | 5/2008 | Dearing | G06K 7/10336 235/385 |
| 2008/0224875 | A1* | 9/2008 | Phillips | G06K 7/10316 340/572.8 |
| 2008/0283596 | A1* | 11/2008 | Ishida | B65G 1/137 235/385 |
| 2009/0021345 | A1* | 1/2009 | Sriharto | G08B 13/1427 340/5.6 |
| 2009/0091453 | A1* | 4/2009 | Ishida | G06F 19/3462 340/572.1 |
| 2010/0017023 | A1* | 1/2010 | Jacomet | G07F 9/026 700/236 |
| 2010/0252626 | A1* | 10/2010 | Elizondo | G06Q 10/087 235/385 |
| 2012/0000980 | A1 | 1/2012 | Suzuki | |
| 2013/0002443 | A1* | 1/2013 | Breed | G01J 5/0846 340/686.1 |
| 2013/0126611 | A1* | 5/2013 | Kangas | G07G 1/009 235/385 |
| 2013/0195326 | A1* | 8/2013 | Bear | A61J 7/0076 382/128 |
| 2014/0046480 | A1* | 2/2014 | Tanaka | B65G 43/08 700/225 |
| 2014/0138440 | A1* | 5/2014 | D'Ambrosio | G06Q 10/087 235/385 |
| 2014/0158772 | A1* | 6/2014 | Bouveresse | G07G 1/0045 235/486 |
| 2014/0229343 | A1* | 8/2014 | Higgins | G06Q 10/087 705/28 |
| 2015/0029001 | A1* | 1/2015 | Pleshek | H04W 4/008 340/10.5 |
| 2015/0127362 | A1* | 5/2015 | DeBusk | G06F 19/328 705/2 |
| 2015/0302228 | A1 | 10/2015 | Hirono | |
| 2015/0302708 | A1 | 10/2015 | Hattori | |

FOREIGN PATENT DOCUMENTS

| | | |
|---|---|---|
| EP | 3034247 A1 | 6/2016 |
| JP | 2009-093434 | 4/2009 |

OTHER PUBLICATIONS

First Office Action dated Apr. 25, 2019 in corresponding Chinese Patent Application No. 201710471167.X with machine English translation, 12 pages.

* cited by examiner

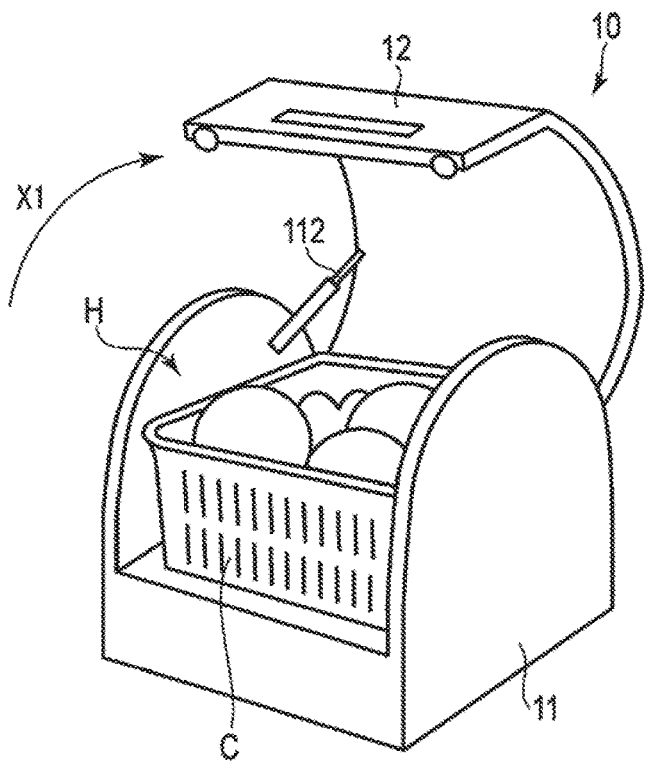
F I G. 2A
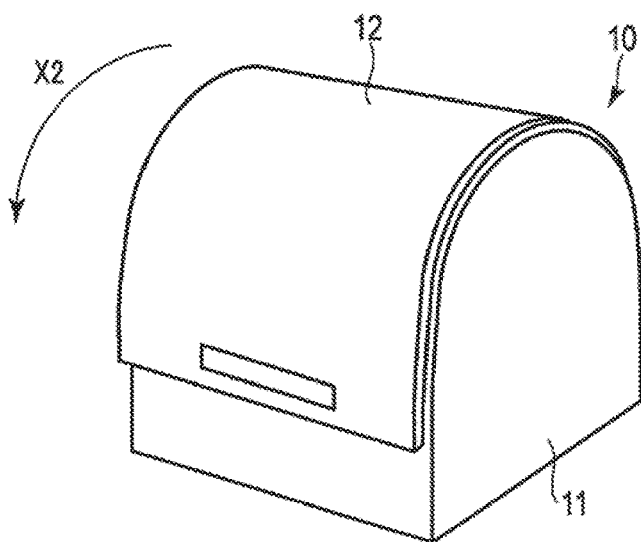
F I G. 2B

D1

Put shopping basket (products)
into reading chamber,
and close opening-and-closing lid

Open opening-and-closing lid,
and take out shopping basket (products)

FIG. 8

READING DEVICE

CROSS-REFERENCE TO RELATED APPLICATIONS

This application is based upon and claims the benefit of priority from Japanese Patent Application No. 2016-124700, filed Jun. 23, 2016, the entire contents of which are incorporated herein by reference.

FIELD

Embodiments described herein relate generally to a reading device.

BACKGROUND

There is known a product sales data processing device. The product sales data processing device reads product information from an RFID (radio frequency identifier) tag which is attached to each product, and executes a sales registration and accounting process, based on the product information. For example, if products, or a shopping basket which contains products, is placed on an upper surface of a checkout counter in which a planar antenna is embedded, a reading device reads batchwise product information from the RFID tags attached to the products.

In addition, there is proposed a box-shaped reading device as another mode. In this reading device, a reading chamber for reading RFID tags is provided in a housing which is formed of a metal or the like. In addition, an opening-and-closing lid for accessing the reading chamber is provided in the housing. If products (shopping basket) are put in the reading chamber, the reading device reads batchwise the product information from the RFID tags attached to the products.

In the meantime, when reading is executed by using the above-described box-shaped reading device, the reading is started after the products are put in the reading chamber and the opening-and-closing lid is closed, in order to prevent a read error or the like. Then, after the reading is finished, the opening-and-closing lid is opened and the shopping basket is taken out from the reading chamber. However, for example, a user, who is unfamiliar with operations, may perform an improper operation. For example, the user may perform an improper operation, such as opening the opening-and-closing lid during reading, or forgetting to open the opening-and-closing lid after the end of reading. In such a case, there is a possibility that a delay occurs in processing. Thus, there is a demand for a technique which can provide a guidance on a proper operation method.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2A is an external-appearance perspective view illustrating an example of a schematic configuration of a reading device according to the embodiment, FIG. 2A illustrating an example of an open state in which an opening-and-closing lid of the reading device is opened.

FIG. 2B is an external-appearance perspective view illustrating an example of the schematic configuration of the reading device according to the embodiment, FIG. 2B illustrating an example of a closed state in which the opening-and-closing lid of the reading device is closed.

FIG. 7 is a view illustrating an example of an alert screen which is displayed on a display of the self-checkout device according to the embodiment.

FIG. 8 is a view illustrating an example of the alert screen which is displayed on the display of the self-checkout device according to the embodiment.

DETAILED DESCRIPTION

Various embodiments will be described hereinafter with reference to the accompanying drawings.

In general, according to one embodiment, a reading device is configured to read information from an RFID tag attached to a product. The reading device includes a housing, an antenna, an opening-and-closing lid, a detector, a reading unit, and an alert unit. The housing includes an opening portion functioning as an inlet and an outlet of the product, and therein a space for accommodating the product. The antenna is provided within the space. The opening-and-closing lid is opening and closing the opening portion. The detector is configured to detect an open or closed state of the opening-and-closing lid. The reading unit is configured to execute a reading process of reading, via the antenna, the information from the RFID tag of the product accommodated in the housing. The alert unit is configured to issue an alert on an operation method in accordance with the open or closed state of the opening-and-closing lid and an operation state of the reading unit.

Figure 1:
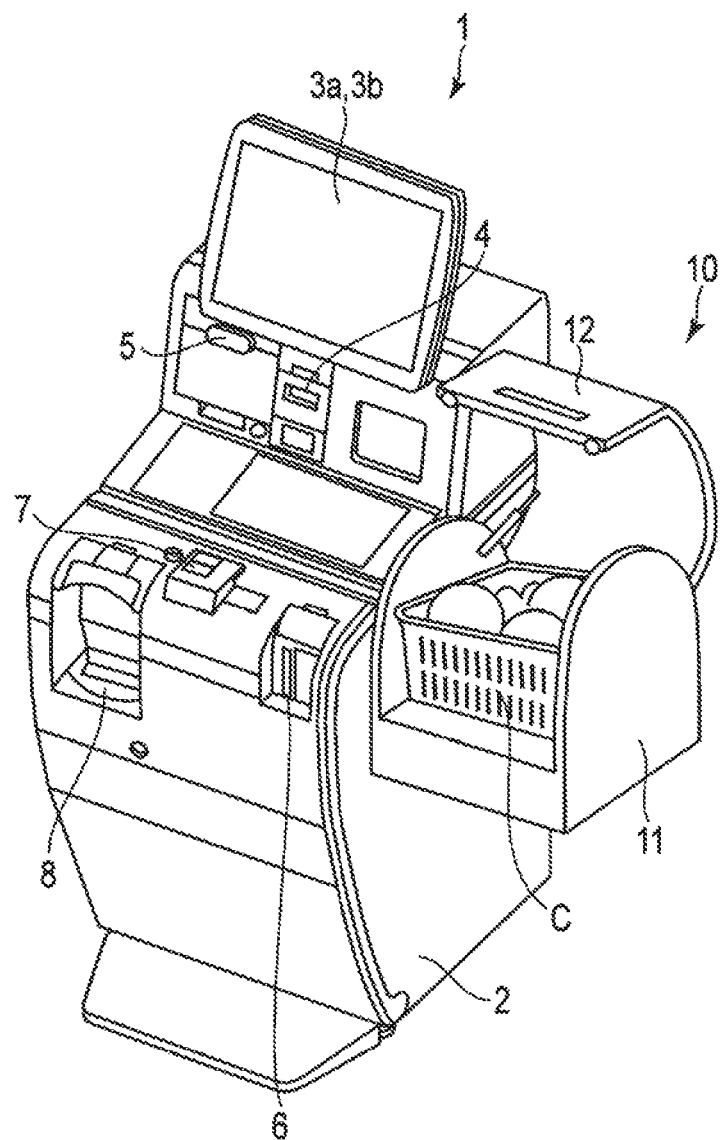
FIG. 1 is an external-appearance perspective view illustrating an example of the configuration of a self-checkout device according to an embodiment.

FIG. 1 is an external-appearance perspective view illustrating an example of the configuration of a self-checkout device 1 according to an embodiment. The self-checkout device 1 is a product sales data processing device which executes a product sales registration and accounting process. The self-checkout device 1 is installed, for example, in a store such as a supermarket or a clothing store. For example, the self-checkout device 1 is utilized by a customer who uses a store, or a salesclerk who takes the place of the customer. A main body of the self-checkout device 1 includes a display 3b. On the surface of the display 3b, a touch panel 3a is disposed. For example, a liquid crystal display is used as the display 3b.

In addition, the main body 2 is provided with a card slot 4 for inserting a customer's point card or credit card at a time of settlement, and a receipt issue slot 5 which issues a receipt. Furthermore, the main body 2 is provided with a banknote input/output port 6 for inputting banknotes for settlement, and receiving banknotes as change, a coin injection port 7 for injecting coils at a time of settlement, and a coin take-out port 8 for receiving coins as change.

The right side of the main body 2 is equipped with a reading device 10 for reading RFID (Radio Frequency IDentifier) tags (see FIG. 3) which are attached to products G. The reading device 10 is connected to the self-checkout device 1 by a cable or the like, and outputs (transmits) various information, which is read from the RFID tags attached to the products G, to the self-checkout device 1. Here, it is assumed that the RFID tag T, which stores a product code or the like for identifying each product G, is attached to each product G. In addition, it is assumed that a storage area for writing a completion-of-registration flag (to be described later) is prepared in the RFID tag T. The write of the completion-of-registration flag aims at preventing an unsettled product G from being brought out from the store. The presence/absence of the completion-of-registration flag is checked, for example, at a gate disposed at the entrance/exit of the store, and an alarm is issued by a buzzer or the like with respect to the product G which does not have the completion-of-registration flag.

Figure 3:
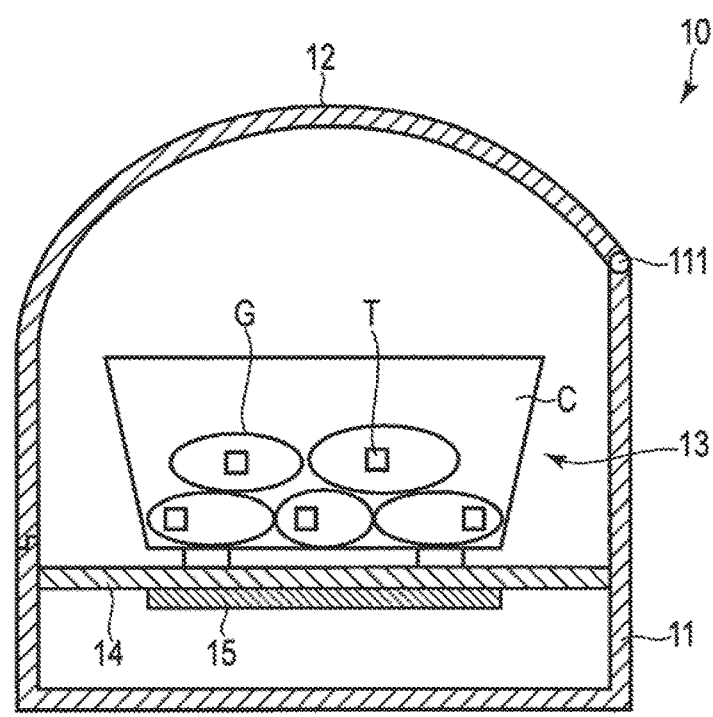
FIG. 3 is a schematic cross-sectional view of an example of the reading device.

Hereinafter, the reading device 10 will be described. FIG. 2A and FIG. 2B are external-appearance perspective views illustrating an example of the schematic configuration of the reading device 10. FIG. 2A illustrates an open state in which an opening-and-closing lid 12 of the reading device 10 is opened, and FIG. 2B illustrates a closed state in which the opening-and-closing lid 12 of the reading device 10 is closed. In addition, FIG. 3 is a schematic cross-sectional view of an example of the reading device 10, and illustrates the closed state of the opening-and-closing lid 12.

The reading device 10 includes a housing 11 which mainly forms an exterior of the reading device 10, and the opening-and-closing lid 12 for opening and closing an opening portion H which functions as an inlet/outlet of a shopping basket C (products G) provided in the housing 11. For example, the outer shape of the housing 11 is a substantially box-like shape, and has a proportion with a greater length in a depth direction such that a depth dimension is greater than a lateral width dimension, or a proportion with a greater length in the lateral width direction such that the lateral width dimension is greater than the depth dimension. Here, the size of the opening portion H is such a size as to be capable of passing the shopping basket C through, in the state in which the shopping basket C contains the products G. In addition, the housing 11 includes a reading chamber 13 with such a size as to be capable of accommodating the shopping basket C.

In order to prevent external electric waves from reaching the inside of the reading chamber 13, the housing 11 and opening-and-closing lid 12 are formed of a material (electric wave reflecting material) which reflects electric waves, or a material (electric wave absorbing material) which absorbs electric waves. As such materials, use can be made of publicly known or publicly used electric wave reflecting materials or electric wave absorbing materials, such as metals, mold materials, ferrites, etc. In addition, such a configuration may be adopted that the outer walls (outer surfaces) of the housing 11 and opening-and-closing lid 12, and the inner walls (inner surfaces) of the housing 11 and opening-and-closing lid 12 are covered with electric wave reflecting materials or electric wave absorbing materials.

The opening-and-closing lid 12 can be set in the open state by pulling up the opening-and-closing lid 12 in an arrow X1 direction about a hinge mechanism 111 which is provided in a back surface portion of the housing 11 (FIG. 2A). In addition, the opening-and-closing lid 12 can be set in the closed state by pulling down the opening-and-closing lid 12 in an arrow X2 direction about the hinge mechanism 111 (FIG. 2B). The customer can take the basket C, which contains the products G, into and out from the reading chamber 13 of the housing 11 via the opening portion H of the housing 11. Incidentally, in order to decrease the opening and closing speed of the opening-and-closing lid 12 or to keep the open state, a damper 112 may be provided between the housing 11 and the opening-and-closing lid 12 (see FIG. 2A).

In the reading chamber 13, the shopping basket C is placed on a placement table 14. The placement table 14 is composed of a plate-like member which is formed of a material with an insulating properly (electric wave permeability) such as wood or glass. The placement table 14 is supported with a predetermined gap from the housing 11. In addition, a planar RFID antenna 15 is provided on the side of a surface (hereinafter referred to as "bottom surface") which is opposed to a placement surface of the shopping basket C in the placement table 14. The RFID antenna 15 emits electric waves of a UHF band or the like, thereby communicating with the RFID tag T existing in the reading chamber 13, that is, the RFID tag T of each product G contained in the shopping basket C (see FIG. 3). Incidentally, the number of RFID antennas 15 is not limited to one, and a plurality of RFID antennas 15 may be provided in some mode. In addition, the method of installing the RFID antenna 15 is not limited to the above example, and the RFID antenna 15 may be provided, for example, separately from the placement table 14. Besides, the position of installation of the RFID antenna 15 is not limited to the bottom surface side in the reading chamber 13 or placement table 14, and the RFID antenna 15 may be provided on another surface, such as a side surface of the reading chamber 13, in some mode.

According to the reading device 10 with the above-described configuration, the products G (RFID tags T) in the shopping basket C can be read batchwise, by putting the shopping basket C in the reading chamber 13. In addition, by using the reading device 10, it is possible to reduce the influence which the environment of the surrounding of the reading device 10 exerts upon the reading operation. Therefore, the reading of the RFID tags T can efficiently be executed.

Figure 4:
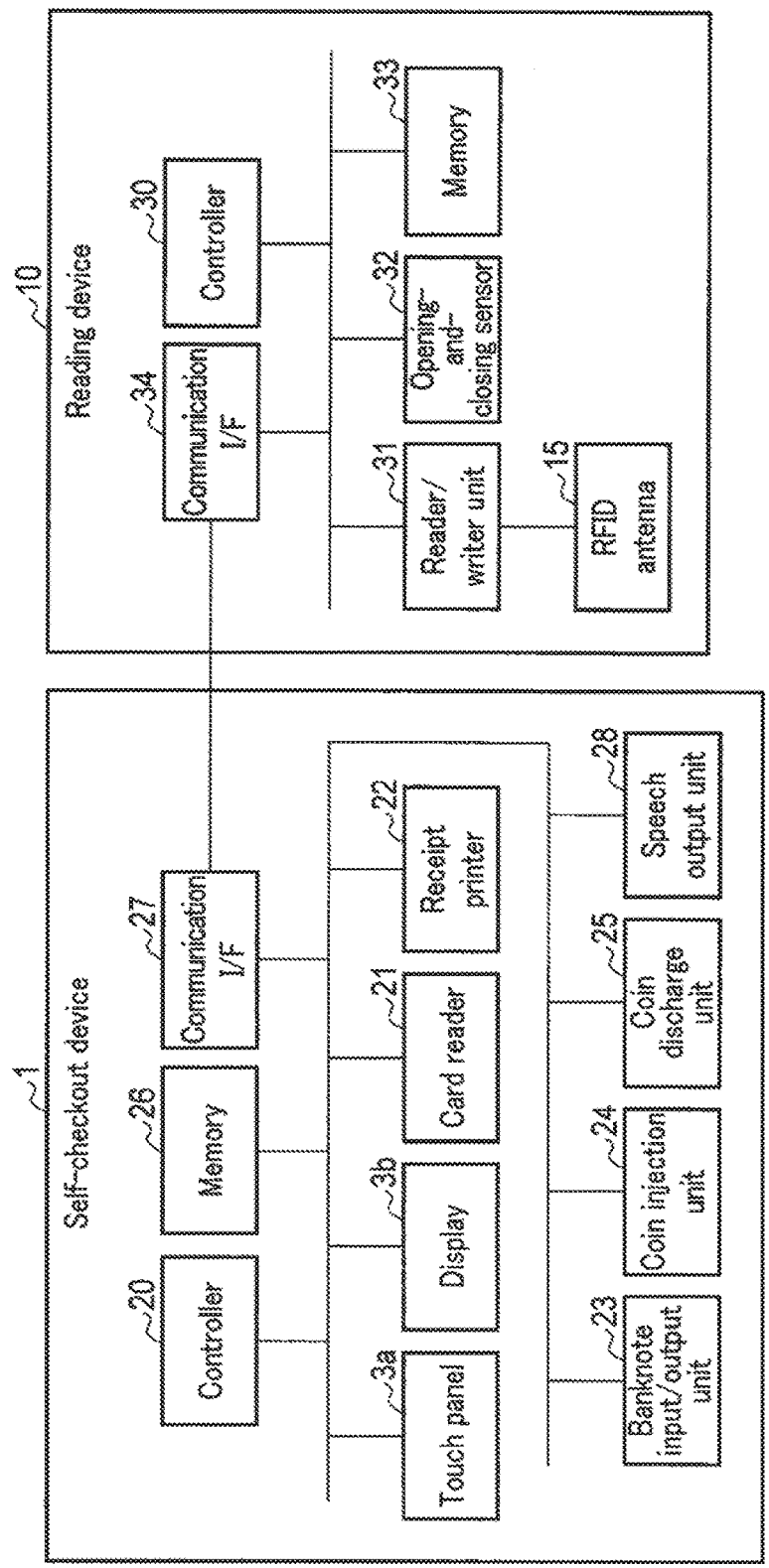
FIG. 4 is a block diagram illustrating an example of hardware configurations of the self-checkout device and reading device according to the embodiment.

Hereinafter, an example of the hardware configurations of the self-checkout device 1 and reading device 10 will be described. FIG. 4 is a block diagram illustrating an example of the hardware configurations of the self-checkout device 1 and reading device 10.

The self-checkout device 1 includes a controller 20 with a computer configuration which is composed of at least one processor such as a CPU (Central Processing Unit), a ROM (Read Only Memory), and a RAM (Random Access Memory). The ROM stores various programs which the CPU executes, and various data. The RAM temporarily stores data and programs when the CPU executes various programs.

A touch panel 3a, a display 3b, a card reader 21, a receipt printer 22, a banknote input/output unit 23, a coin injection unit 24, and a coin discharge unit 25 are connected to the controller 20 via various input/output circuits.

The card reader 21 reads information of a customer's point card or credit card, which is inserted from the card slot 4. The receipt printer 22 prints a receipt after an accounting process, and issues the receipt from the receipt issue slot 5. The banknote input/output unit 23 processes banknotes which are input or output through the banknote input/output port 6. In addition, the coin injection unit 24 processes coins which are injected from the coin injection port 7, and the coin discharge unit 25 processes coins which are discharged from the coin take-out port 8.

Furthermore, a memory 26, a communication I/F 27 and a speech output unit 28 are connected to the controller 20 via various input/output circuits.

The memory 26 is a storage device including a nonvolatile storage medium such as an HDD (Hard Disk Drive) or an SSD (Solid State Drive). The memory 26 stores various programs and various data relating to the operation of the self-checkout device 1. Examples of the data, which the memory 26 stores, include a product master in which product information relating to each product G and a product code for identifying the product G are associated and registered. This product information includes, for example, a product name and a price of the corresponding product G. The communication I/F 27 is an interface for transmitting/receiving various data to/from the reading device 10. The speech output unit 28 is a speech output device such as a buzzer or a speaker.

On the other hand, the reading device 10 includes a controller 30 with a computer configuration which is composed of at least one processor such as a CPU, a ROM and a RAM. The ROM stores various programs which the CPU executes, and various data. The RAM temporarily stores data and programs when the CPU executes various programs.

In addition, a reader/writer unit 31, an opening-and-closing sensor 32, a memory 33 and a communication I/F 34 are connected to the controller 30 via various input/output circuits.

By using the RFID antenna 15, the reader/writer unit 31 transmits modulation waves (electric waves) for executing read/write from/to the RFID tag T. The reader/writer unit 31 outputs to the controller 30 various information (e.g. product information) which is read from the RFID tag T via the RFID antenna 15. In addition, the reader/writer unit 31 outputs write-target information (e.g. flag information) via the RFID antenna 15, thereby writing the information to the RFID tag T.

The opening-and-closing sensor 32 is a sensor device which senses an open or closed state of the opening-and-closing lid 12. The opening-and-closing sensor 32 outputs a sensing result, which indicates the open or closed state of the opening-and-closing lid 12, to the controller 30. The opening-and-closing sensor 32 can be realized by, for example, a microswtich or a magnetic sensor, which is provided in a contact portion between the housing 11 and opening-and-closing lid 12 or in the hinge mechanism 111 of the opening-and-closing lid 12. In addition, when the reading chamber 13 becomes a dark place in the closed state of the opening-and-closing lid 12, the opening-and-closing sensor 32 can be realized by a photosensor provided in this reading chamber 13.

The memory 33 is a storage device including a nonvolatile storage medium such as an HDD or an SSD. The memory 33 stores various programs and various data relating to the operation of the reading device 10. The communication I/F 34 is an interface for transmitting/receiving various data to/from the self-checkout device 1.

Figure 5:
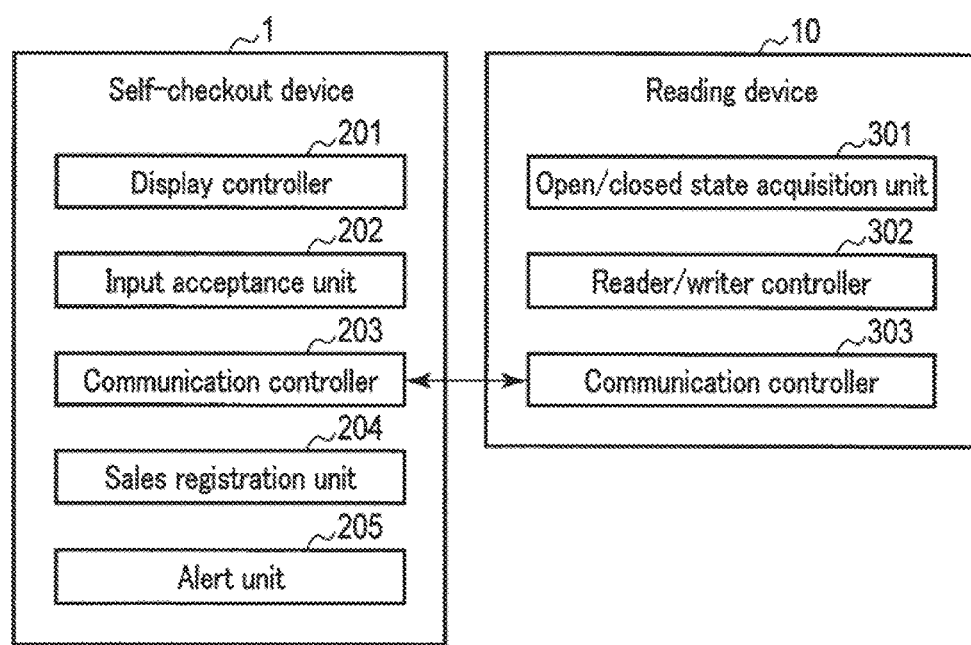
FIG. 5 is a block diagram illustrating an example of functional configurations of the self-checkout device and reading device according to the embodiment.

Next, the functional configurations of the self-checkout device 1 and reading device 10 will be described. FIG. 5 is a block diagram illustrating the functional configurations of the self-checkout device 1 and reading device 10.

The controller 30 (at least one processor such as a CPU) of the reading device 10 cooperates with the programs stored in the memory 33, thereby realizing, as functional units, an open/closed state acquisition unit 301, a reader/writer controller 302 and a communication controller 303.

The open/closed state acquisition unit 301 acquires a sensing result of the opening-and-closing sensor 32, and determines whether the opening-and-closing lid 12 is in the open state or in the closed state.

The reader/writer controller 302 controls the reader/writer unit 31, thereby executing a reading process of reading the RFID tag T and writing the completion-of-registration flag.

Specifically, upon receiving a read start instruction from the self-checkout device 1, the reader/writer controller 302 starts reading the RFID tags T. In addition, upon receiving a read end instruction from the self-checkout device 1, the reader/writer controller 302 finishes reading the RFID tags T. Furthermore, upon receiving an instruction for completion of registration from the self-checkout device 1, the reader/writer controller 302 controls the reader/writer unit 31 and starts writing the completion-of-registration flag. Here, it is assumed that the completion-of-registration flag is information indicating that sales registration was completed, and is written in a predetermined memory area which the RFID tag T includes.

The communication controller 303 controls the communication I/F 34, and transmits/receives various information to/from the self-checkout device 1 via the communication I/F 34. For example, the communication controller 303 cooperates with the open/closed state acquisition unit 301 and reader/writer controller 302, thereby transmitting to the self-checkout device 1 state information indicating the open or closed state of the opening-and-closing lid 12 and the operation state of the reader/writer controller 302.

On the other hand, the controller 20 (at least one processor such as a CPU) of the self-checkout device 1 cooperates with the programs stored in the memory 26, thereby realizing, as functional units, a display controller 201, an input acceptance unit 202, a communication controller 203, a sales registration unit 204, and an alert unit 205.

The display controller 201 controls the display 3b, and causes the display 3b to display various screens. For example, the display controller 201 cooperates with the input acceptance unit 202, thereby displaying an operation screen (user interface) for operating the self-checkout device 1. The operation screen includes an operation element (hereinafter referred to as "read start button") for instructing a read start of the RFID tags (product codes), and an operation element (hereinafter "read end button") for instructing a read end.

In addition, the display controller 201 cooperates with the sales registration unit 204, thereby displaying information relating to the products G (product codes) read by the reading device 10, a deposit money amount, a change amount, etc. Besides, the display controller 201 cooperates with the alert unit 205, thereby displaying various alert screens.

The input acceptance unit 202 accepts an operation input through the touch panel 3a. For example, when an operation element was operated on the operation screen displayed on the display 3b, the input acceptance unit 202 outputs instruction information corresponding to this operation element to the controller 20.

The communication controller 203 controls the communication I/F 27, and transmits/receives various information to/from the reading device 10 via the communication I/F 27. For example, if the read start button is operated, the communication controller 203 transmits instruction information instructing a read start to the reading device 10. In addition, the communication controller 203 receives the product codes which are transmitted from the reading device 10. Besides, if the read end button is operated, the communication controller 203 transmits instruction information instructing a read end to the reading device 10. Furthermore, if sales registration by the sales registration unit 204 is completed, the communication controller 203 transmits instruction information instructing completion of registration to the reading device 10.

If the sales registration unit 204 confirms the payment of the amount by the settlement process with respect to the products G corresponding to the product codes transmitted from the reading device 10, the sales registration unit 204 executes sales registration of these product codes as the products G which the customer purchased. Specifically, the sales registration unit 204 registers, in a database for registration, the product codes of the products G together with the deposit amount, change, and the date/time of transaction. Incidentally, the database for registration may be implemented in a mode in which the memory 26 of the self-checkout device 1 includes the database for registration, or may be implemented in a mode in which an external device, which is communicable with the self-checkout device 1, includes the database for registration.

The alert unit 205 is a functional unit which issues an alert in accordance with the state of the reading device 10. Specifically, the alert unit 205 detects the open or closed state of the opening-and-closing lid 12 and the operation state of the reader/writer controller 302, based on the state information which is transmitted from the communication controller 303 of the reading device 10. In addition, when the combination between the open or closed state of the opening-and-closing lid 12 and the operation state of the reader/writer controller 302 corresponds to a predetermined condition, the alert unit 205 issues an alert of an alert content (operation method) corresponding to this condition. Here, it is assumed that each condition (the state of the reading device 10) and the alert information indicative of the alert content are associated and stored in the memory 26 or the like. Incidentally, the conditions and alert contents can arbitrarily be set.

In the present embodiment, as a first condition, an AND condition is set in which the reading process is being executed and the opening-and-closing lid 12 is in the open state, and, as the alert content, alert information instructing the closing of the opening-and-closing lid 12 is set. In this case, if the alert unit 205 detects that the opening-and-closing lid 12 entered the open state while the reader/writer controller 302 is executing the reading process, the alert unit 205 issues an alert to close the opening-and-closing lid 12. Thereby, in such a case that the opening-and-closing lid 12 was opened during the reading process, the user can be guided to close the opening-and-closing lid 12.

In addition, as a second condition, an AND condition is set in which the reading process was finished and the opening-and-closing lid 12 remains in the closed state for a predetermined time, and, as the alert content, alert information instructing the opening of the opening-and-closing lid 12 is set. In this case, if the opening-and-closing lid 12 remains in the closed state for the predetermined period after the reader/writer controller 302 finished the reading process, the alert unit 205 issues an alert to open the opening-and-closing lid 12. Thereby, since the user can be prompted to open the opening-and-closing lid 12 after the end of the reading process, it is possible to prevent the user from forgetting to take out the products G. Incidentally, the predetermined time, which relates to the determination of the closed state, can be set to an arbitrary value, such as 0 second, or 15 seconds.

In the meantime, the alert method is not particularly limited. For example, the alert unit 205 may cooperate with the display controller 201, thereby to display the alert screen on the display 3b, or may cooperate with the speech output unit 28, thereby to issue an alert by speech.

Figure 6:
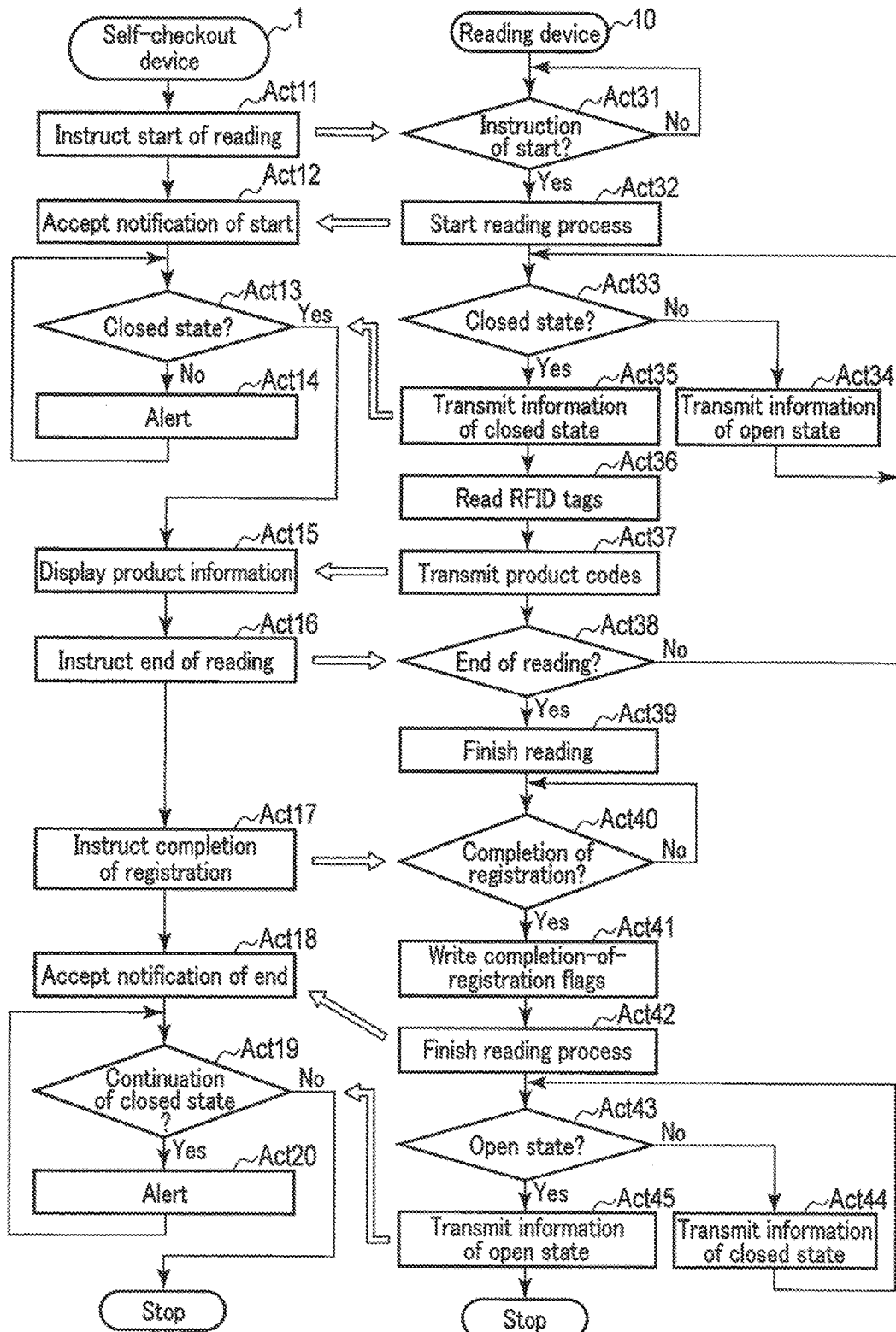
FIG. 6 is a flowchart for describing an operation example of the self-checkout device and reading device according to the embodiment.

Next, the operations of the self-checkout device 1 and reading device 10 will be described. FIG. 6 is a flowchart for describing an operation example of the self-checkout device 1 and reading device 10. Incidentally, the present operation example illustrates an operation example of issuing an alert based on the above-described first condition and second condition.

A customer, who operates the self-checkout device 1, opens the opening-and-closing lid 12 of the reading device 10, and puts the shopping basket C, which contains products G, into the reading chamber 13. Then, the customer operates the read start button which is displayed on the display 3b of the self-checkout device 1. Thereby, the present process is started.

In the self-checkout device 1, if the input acceptance unit 202 accepts the operation of the read start button, the communication controller 203 transmits instruction information instructing a read start to the reading device 10 (Act 11).

On the other hand, in the reading device 10, the reader/writer controller 302 stands by until a read start is instructed (Act 31; No). Upon accepting the read start instruction (Act 31; Yes), the reader/writer controller 302 starts a reading process (Act 32), and notifies the self-checkout device 1 to that effect. Here, the notification of the start of the reading process is state information indicating that the reader/writer controller 302 started the reading process.

Subsequently, the open/closed state acquisition unit 301 acquires a sensing result of the opening-and-closing sensor 32, and determines whether the opening-and-closing lid 12 is in the closed state or not (Act 33). If the opening-and-closing lid 12 is in the open state (Act 33; No), the open/closed state acquisition unit 301 transmits state information, which notifies the open state, to the self-checkout device 1 (Act 34), and returns to Act 33. In the meantime, while the opening-and-closing lid 12 is in the open state, the reader/writer controller 302 does not read RFID tags T.

In Act 33, if the opening-and-closing lid 12 is in the closed state (Act 33; Yes), the open/closed state acquisition unit 301 transmits state information, which notifies the closed state, to the self-checkout device 1 (Act 35), and advances to Act 36.

In the self-checkout device 1, upon accepting the notification of the start of the reading process from the reading device 10 (Act 12), the alert unit 205 judges that the reading device 10 is executing the reading process. Subsequently, the alert unit 205 determines the open or closed state of the opening-and-closing lid 12, based on the state information which is sent from the reading device 10 (Act 13). Here, if the alert unit 205 determines that the opening-and-closing lid 12 is in the open state (Act 13, No), the alert unit 205 issues an alert by using an alert screen or speech (Act 14) and returns to Act 13. In Act 14, the alert unit 205 issues an alert to close the opening-and-closing lid 12.

FIG. 7 is a view illustrating an example of the alert screen which is displayed on the display 3b in Act 14. As illustrated in FIG. 7, an alert screen D1 includes a message which guides the customer to put the products G (shopping basket C) into the reading chamber 13, and to close the opening-and-closing lid 12. The customer refers to the alert screen D1 displayed on the display 3b, puts the products G (shopping basket C) into the reading chamber 13, and performs an operation of closing the opening-and-closing lid 12. Incidentally, the alert unit 205 may be configured to output the message, which is displayed on the alert screen D1, from the speech output unit 28.

In Act 13, if the alert unit 205 determines that the opening-and-closing lid 12 is in the closed state (Act 13; Yes), the alert unit 205 advances to Act 15. In the meantime, when the alert unit 205 issues the alert in Act 14, the alert unit 205 stops issuing the alert, upon determining the closed state.

On the other hand, in the reading device 10, the reader/writer controller 302 reads the RFID tags T (Act 36). The communication controller 303 successively transmits the product codes, which are read from the RFID tags T in Act 36, to the self-checkout device 1 (Act 37).

Subsequently, the reader/writer controller 302 determines whether the end of reading was instructed from the self-checkout device 1 (Act 38). If the end of reading is not instructed (Act 38; No), the reader/writer controller 302 returns to Act 33.

In the self-checkout device 1, if the communication controller 203 receives the products codes from the reading device 10, the sales registration unit 204 reads out product information, which corresponds to the product codes, from the product master, and causes the display 3b to display the product information (Act 15).

The customer refers to the product information displayed on the display 3b. Upon confirming, for instance, that all products G contained in the shopping basket C were displayed, the customer operates the read end button displayed on the display 3b. Then, if the input acceptance unit 202 accepts the operation of the read end button, the communication controller 203 transmits instruction information instructing the end of reading to the reading device 10 (Act 16).

In the reading device 10, if the reader/writer controller 302 accepts the instruction information instructing the end of reading (Act 38; Yes), the reader/writer controller 302 ends the reading of RFID tags T (Act 39). Subsequently, the reader/writer controller 302 stands by until the completion of registration is instructed from the self-checkout device 1 (Act 40; No). Incidentally, after the process of Act 39, the reader/writer controller 302 may be configured to notify the self-checkout device 1 of the end of reading of RFID tags T.

In the self-checkout device 1, if the settlement process of the products G, which are displayed as registration candidates, completes, the sales registration unit 204 executes sales registration of these products G. Then, the communication controller 203 transmits instruction information instructing completion of registration to the reading device 10 (Act 17).

In the reading device 10, if the reader/writer controller 302 accepts the instruction information instructing completion of registration (Act 40; Yes), the reader/writer controller 302 starts writing the completion-of-registration flags to the RFID tags T of the respective products G (Act 41). Upon completing the write of the completion-of-registration flags, the reader/writer controller 302 finishes the reading process (Act 42), and notifies the self-checkout device 1 to that effect. Here, the notification of the end of the reading process is state information indicating that the reader/writer controller 302 finished the reading process. Incidentally, at the time of the process of Act 41, the reader/writer controller 302 may be configured to notify the self-checkout device 1 of the start of the write of the completion-of-registration flags.

Subsequently, the open/closed state acquisition unit 301 acquires a sensing result of the opening-and-closing sensor 32, and determines whether the opening-and-closing lid 12 is in the open state or not (Act 43). Here, if the opening-and-closing lid 12 is in the closed state (Act 43; No), the open/closed state acquisition unit 301 transmits state information, which notifies the closed state, to the self-checkout device 1 (Act 44), and returns to Act 43. In addition, if the opening-and-closing lid 12 is in the open state (Act 43; Yes), the open/closed state acquisition unit 301 transmits state information, which notifies the open state, to the self-checkout device 1 (Act 45), and finishes the process.

In the self-checkout device 1, upon accepting the notification of the end of the reading process from the reading device 10 (Act 18), the alert unit 205 judges that the reading device 10 finished the reading process. Then, based on the state information transmitted from the reading device 10, the alert unit 205 determines whether the closed state of the opening-and-closing lid 12 continued for a predetermined time (Act 19). Here, if the closed state continued for the predetermined time (Act 19; Yes), the alert unit 205 issues an alert by using the alert screen or speech (Act 20), and returns to Act 19. In Act 20, the alert unit 205 issues an alert to open the opening-and-closing lid 12.

FIG. 8 is a view illustrating an example of the alert screen which is displayed on the display 3b of the self-checkout device 1 in Act 20. As illustrated in FIG. 8, an alert screen D2 includes a message which guides the customer to open the opening-and-closing lid 12 and to take out the products G (shopping basket C) from the reading chamber 13. The customer refers to the alert screen D2 displayed on the display 3b, and performs an operation of taking out the products G (shopping basket C) from the reading chamber 13. Incidentally, the alert unit 205 may be configured to output the message, which is displayed on the alert screen D2, from the speech output unit 28.

On the other hand, if the alert unit 205 determines that the opening-and-closing lid 12 is in the open state (Act 19; No), the alert unit 205 finishes the process. Incidentally, when the alert unit 205 issued the alert in Act 20, the alert unit 205 stops issuing the alert, based on the determination of the open state. Specifically, the alert unit 205 finishes the display of the message or guidance, upon detecting that the opening-and-closing lid 12 of the reading device 10 was opened while the alert screen D2 was displaying the message or guidance.

As described above, according to the present embodiment, when the open or closed state of the opening-and-closing lid 12 and the operation state of the reader/writer controller 302 correspond to a predetermined condition, the alert unit 205 issues an alert on an alert content (operation method) corresponding to this condition. Thereby, for example, when the user opened the opening-and-closing lid 12 during the reading, or when the user forgets to open the opening-and-closing lid 12 after the end of reading, the user can be given a guidance on the proper operation method.

The embodiment was described above. This embodiment was illustrated by way of example, and does not intend to restrict the scope of the invention. For example, in the above-described embodiment, the reading of the RFID tags T is started in accordance with the operation instruction from the customer, but the embodiment is not limited to this mode. In another mode, for example, the reading of RFID tags T may automatically start in interlock with the switching of the opening-and-closing lid 12 to the closed state, without requiring an operational instruction from the customer.

Additionally, in the above-described embodiment, the reading of RFID tags T ends in accordance with an end instruction from the customer, but the embodiment is not limited to this mode. In another embodiment, for example, upon reading the RFID tags T corresponding to the number (number of products) instructed by the customer, the reading may automatically end.

Additionally, in the above-described embodiment, the first condition and the second condition were described, but the conditions for an alert are not limited to the first and second conditions. For example, an AND condition, in which the reader/writer controller 302 is executing the reading process and the opening-and-closing lid 12 is in the closed state, may be set, and alert information, which instructs keeping the opening-and-closing lid 12 in the closed state, may be set as alert content. In this case, the alert unit 205 issues an alert notifying the customer of keeping the opening-and-closing lid 12 in the closed state, while the reader/writer controller 302 is executing the reading process and the opening-and-closing lid 12 is in the closed state. Thereby, it is possible to guide (alert) the user not to open the opening-and-closing lid 12 during the reading process.

Additionally, in the above-described embodiment, the AND condition of the open or closed state of the opening-and-closing lid 12 and the operation state of the reader/writer controller 302 is set as the condition for an alert. Alternatively, an OR condition may be set as the condition for an alert. For example, when the reader/writer controller 302 is executing the reading process, an instruction may be set to keep the opening-and-closing lid 12 in the closed state, regardless of the state of the opening-and-closing lid 12. In this case, the alert unit 205 issues an alert to keep the closed state of the opening-and-closing lid 12, while the reader/writer controller 302 is executing the reading process. Thereby, like the above, it is possible to guide (alert) the user not to open the opening-and-closing lid 12 during the reading process.

Additionally, in the flowchart of FIG. 6, during the period of Act 39 to Act 42, the open or closed state of the opening-and-closing lid 12 is not determined, but the restriction to this configuration is unnecessary. For example, in another configuration, like the period of Act 36 to Act 38, the open or closed state of the opening-and-closing lid 12 may be determined, an alert to close the opening-and-closing lid 12 may be issued when the opening-and-closing lid 12 entered the open state.

Additionally, in the configuration of the above embodiment, the write of the completion-of-registration flag is included in the reading process. However, in another configuration, the write of the completion-of-registration flag may not be included in the reading process. Besides, in another configuration, the write of the completion-of-registration flag may be defined as a process (writing process) which is different and independent from the reading process, and the same alert as in the above-described embodiment may be issued with respect to each of the reading process and writing process.

Additionally, in the above-described embodiment, the reading device, which is composed of the self-checkout device 1 and reading device 10, was described, but the restriction to this configuration is unnecessary. For example, in another configuration, the self-checkout device 1 and reading device 10 may be integrated as one piece. Besides, the embodiment is applicable to a product sales data processing device which employs a method other than the self-checkout method in which the customer himself/herself performs reading of products.

Additionally, in the configuration of the above embodiment, the self-checkout device 1 includes the alert unit 205. However, in another configuration, the reading device 10 may include the alert unit 205. In this case, the alert unit 205 of the reading device 10 issues an alert in accordance with the determination result (open or closed state) of the open/closed state acquisition unit 301 and the operation state of the reader/writer controller 302. Besides, when the alert device (display 3b, speech output unit 28, or the like) exists in an external device or is under control of some other controller, the alert unit 205 may be configured to issue an alert by outputting alert information. In this case, upon receiving the alert information, the external device or other controller notifies the alert content by using the alert device.

Additionally, in the reading device 10 of the above embodiment, the opening-and-closing lid 12 is configured as a top lid type. However, the opening-and-closing lid 12 may be of another type.

The programs, which each of the devices of the above embodiment executes, are provided by being preinstalled in the storage medium (ROM or storage unit) which each device includes. Alternatively, the programs may be provided by being stored in computer-readable storage media such as a CD-ROM, a flexible disk (FD), a CD-R, and a DVD (Digital Versatile Disk) as files of an installable or executable format. Besides, the storage media are not limited to media which are independent from a computer or an embedded system, and the storage media include storage media which store or temporarily store programs that are transmitted from a LAN or the Internet and downloaded.

Additionally, the programs, which each of the devices of the embodiment executes, may be configured to be stored in a computer which is connected to a network such as the Internet and to be provided by being downloaded via the network, or may be configured to be provided or distributed via a network such as the Internet.

According to the above-described embodiment, there can be provided a reading device and a program, which can provide a guidance on an operation method corresponding to the state of the reading device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A reading device configured to read information from an RFID tag attached to a product, comprising:
   a housing including an opening portion and a space for housing the product;
   an antenna provided within the space;
   an opening-and-closing lid configured to cover the opening portion;
   a detector configured to detect state of the opening-and-closing lid, the state including an open state and a closed state;
   a reading unit configured to execute a reading process of reading, via the antenna, the information including a product code from the RFID tag of the product in the housing in response to the detection of the closed state; and an alert unit configured to issue an alert in accordance with the state of the opening-and-closing lid and an operation state of the reading unit, wherein the alert unit issues the alert when either one of a first condition and a second condition is satisfied, wherein the first condition is satisfied when the reading process is being executed and the opening-and-closing lid is in the open state, and the second condition is satisfied when the reading process is completed and the opening-and-closing lid has been in the closed state for a predetermined length of time, and wherein the alert unit issues product information corresponding to the product code read by the reading unit when a third condition is satisfied, wherein the third condition is satisfied when the reading process is being executed and the opening-and-closing lid is in the closed state, and wherein the alert unit issues an alert to close the opening-and-closing lid when the first condition is satisfied.

2. The reading device of claim 1, wherein the alert unit is configured to issue an alert to open the opening-and-closing lid, when the second condition is satisfied.

3. The reading device of claim 1, wherein the alert unit is configured to issue the alert on a display screen.

4. The reading device of claim 1, wherein the alert unit is configured to issue the alert by sound.

5. A non-transitory computer-readable storage medium storing a program being executed by a computer of a reading unit comprising a housing including an opening portion and a space for housing the product, an antenna provided within the space, and an opening-and-closing lid configured to cover the opening portion, the program causing the computer to:

detect a state of the opening-and-closing lid, the state including an open state and a closed state;

execute a reading process of reading, via the antenna, information including a product code from an RFID tag of the product accommodated in the housing in response to the detection of the closed state; and issue an alert in accordance with the state of the opening-and-closing lid and a state of the reading process, wherein the alert is issued when either one of a first condition and a second condition is satisfied, wherein the first condition is satisfied when the reading process is being executed and the opening-and-closing lid is in the open state, and the second condition is satisfied when the reading process is completed and the opening-and-closing lid has been in the closed state for a predetermined length of time, and wherein the alert is issued to inform of product information corresponding to the product code read by the reading unit when a third condition is satisfied, wherein the third condition is satisfied when the reading process is being executed and the opening-and-closing lid is in the closed state, and wherein an alert is issued to close the opening-and-closing lid when the first condition is satisfied.

* * * * *